US008971311B2

(12) United States Patent
Bianconi

(10) Patent No.: US 8,971,311 B2
(45) Date of Patent: Mar. 3, 2015

(54) METHODS, SYSTEMS AND COMPUTER READABLE MEDIA FOR SUPPORTING A PLURALITY OF REAL-TIME TRANSPORT PROTOCOL (RTP) MULTIPLEXING ENABLEMENT METHODS IN A MEDIA GATEWAY

(75) Inventor: Richard J. Bianconi, Rowlett, TX (US)

(73) Assignee: Genband US LLC, Frisco, TX (US)

( * ) Notice: Subject to any disclaimer, the term of this patent is extended or adjusted under 35 U.S.C. 154(b) by 657 days.

(21) Appl. No.: 12/958,270

(22) Filed: Dec. 1, 2010

(65) Prior Publication Data

US 2012/0076131 A1 Mar. 29, 2012

Related U.S. Application Data

(60) Provisional application No. 61/385,833, filed on Sep. 23, 2010.

(51) Int. Cl.
*H04L 12/66* (2006.01)
*H04L 29/06* (2006.01)

(52) U.S. Cl.
CPC ............ *H04L 65/605* (2013.01); *H04L 65/607* (2013.01); *H04L 65/608* (2013.01); *H04L 65/103* (2013.01); *H04L 69/04* (2013.01)
USPC ........... 370/352; 370/235; 370/236; 370/351; 370/354; 370/356

(58) Field of Classification Search
CPC ... H04L 29/06027; H04L 69/04; H04L 29/06; H04L 65/608; H04L 69/16; H04L 65/1043; H04L 65/605; H04L 47/2416; H04L 65/1069; H04L 69/08; H04L 47/801; H04L 2012/6459
USPC ......... 370/351–356, 392, 401, 465, 252, 466, 370/235, 236
See application file for complete search history.

(56) References Cited

U.S. PATENT DOCUMENTS

2007/0211738 A1* 9/2007 Guo ............................. 370/401
2007/0217402 A1* 9/2007 Lin ............................. 370/356

(Continued)

OTHER PUBLICATIONS

3rd Generation Partnership Project, "Technical Specification Group Radio Access Network; Iuh Data Transport," 3GPP TS 25.444 v9.0.2, Release 9 (Feb. 2010)

(Continued)

*Primary Examiner* — Melanie Jagannathan
*Assistant Examiner* — Najeebuddin Ansari
(74) *Attorney, Agent, or Firm* — Fogarty, L.L.C.

(57) ABSTRACT

Methods, systems, and computer readable media for supporting a plurality of RTP multiplexing enablement methods in a media gateway are disclosed. According to one aspect, a system includes a media gateway controller configured to receive a signaling message to establish a call from a peer node in a first network, an a media gateway configured to perform a first and second RTP multiplexing enablement process on the media portion of the call, wherein the first RTP multiplexing enablement process includes sending a real-time transport control protocol (RTCP) Application packet to the peer node, refraining from performing RTP multiplexing on packets sent to the peer node until a reply RTCP Application packet is received from the peer node, and receiving RTP multiplexed packets from the peer node, and wherein the second RTP multiplexing enablement process includes obtaining an Internet protocol (IP) realm identifier that identifies the first network, accessing configuration data in the media gateway using the IP realm identifier to determine a predefined multiplexing enablement action for packets destined for the first network, and executing the determined predefined multiplexing enablement action on packets sent to the peer node in the first network.

22 Claims, 2 Drawing Sheets

(56) References Cited

U.S. PATENT DOCUMENTS

2008/0159518 A1* 7/2008 Lin .............................. 379/229
2009/0175191 A1* 7/2009 Lin et al. ...................... 370/253
2010/0260194 A1* 10/2010 Lin .............................. 370/401
2012/0250513 A1* 10/2012 De Benedittis et al. ...... 370/236

OTHER PUBLICATIONS

3rd Generation Partnership Project, "Technical Specification Group Core Network and Terminals; Core Network Nb Date Transport and Transport Signalling," 3GPP TS 29.414 v9.0.0, Release 9 (Dec. 2009)

Schulzrinne et al., "RTP: A Transport Protocol for Real-Time Applications," Network Working Group, RFC 3550 (Jul. 2003).

Schulzrinne et al., "RTP Profile for Audio and Video Conferences with Minimal Control," Network Working Group, RFC 3551 (Jul. 2003).

Sjoberg et al., "RTP Payload Format and File Storage Format for the Adaptive Multi-Rate (AMR) and Adaptive Multi-Rate Wideband (AMR-WB) Audio Codecs," Network Working Group, RFC 4867 (Apr. 2007).

* cited by examiner

METHODS, SYSTEMS AND COMPUTER READABLE MEDIA FOR SUPPORTING A PLURALITY OF REAL-TIME TRANSPORT PROTOCOL (RTP) MULTIPLEXING ENABLEMENT METHODS IN A MEDIA GATEWAY

RELATED APPLICATIONS

The present application claims the benefit of U.S. Provisional Patent Application Ser. No. 61/385,833, filed Sep. 23, 2010, the disclosure of which is incorporated herein by reference in its entirety.

TECHNICAL FIELD

The subject matter described herein relates to packet processing and delivery of media using real-time transport protocol (RTP) in a media gateway. More particularly, the subject matter described herein relates to systems, methods, and computer readable media for supporting a plurality of RTP multiplexing enablement methods in a media gateway.

BACKGROUND

Real-time transport protocol (RTP) multiplexing is a bearer data transport scheme currently being used by various packet-based networks which allows multiple low bit-rate audio streams associated with different user plane connections (i.e., different RTP sessions) to be transported in a single UDP/IP packet. Using RTP multiplexing allows a network to reduce the significant bandwidth overhead created by UDP/IP headers of individual packets. Namely, an RTP multiplexed packet includes a single UDP/IP header and multiple RTP payload frames. By eliminating all the otherwise unnecessary UDP/IP headers of the individual payloads in the RTP multiplexed packet, the overall bandwidth of a packet network may be reduced significantly.

At present, however, there are difficulties with communicating packets between two media gateways or peer nodes depending on the connecting interface. Specifically, a media gateway in a home network may not be configured to communicate packets via RTP multiplexing because RTP multiplexing is either not supported or not defined by the existing interface. For example, although a media gateway may be able to successfully communicate RTP multiplexed packets with GSM access networks and 3GPP core networks because these networks support RTP multiplexing, the same media gateway may be unable to send RTP multiplexed packets to a peer node in a femtocell access network because a femtocell interface only supports RTP multiplexing in the uplink connection. Similarly, RTP multiplexing difficulties may arise when the media gateway attempts to communicate with a peer node in a network in which RTP multiplexing is not defined, such as an UMTS access network, an IMS core network, or wireline network.

Accordingly, there is a need for systems, methods, and computer readable media for supporting a plurality of RTP multiplexing enablement methods in a media gateway.

SUMMARY

According to one aspect, the subject matter described herein includes a system for supporting a plurality of RTP multiplexing enablement methods in a media gateway. In one embodiment, the system includes a media gateway controller configured to receive a signaling message to establish a call from a peer node in a first network and a media gateway configured to perform a first and second RTP multiplexing enablement process on the media portion of the call, wherein the first RTP multiplexing enablement process includes sending a real-time transport control protocol (RTCP) Application packet to the peer node, refraining from performing RTP multiplexing on packets sent to the peer node until a reply RTCP Application packet is received from the peer node, and receiving RTP multiplexed packets from the peer node, and wherein the second RTP multiplexing enablement process includes obtaining an Internet protocol (IP) realm identifier that identifies the first network, accessing configuration data in the media gateway using the IP realm identifier to determine a predefined multiplexing enablement action for packets destined for the first network, and executing the determined predefined multiplexing enablement action on packets sent to the peer node in the first network.

The subject matter described herein for supporting a plurality of RTP multiplexing enablement methods in a media gateway may be implemented in hardware, software, firmware, or any combination thereof. As such, the terms "function" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
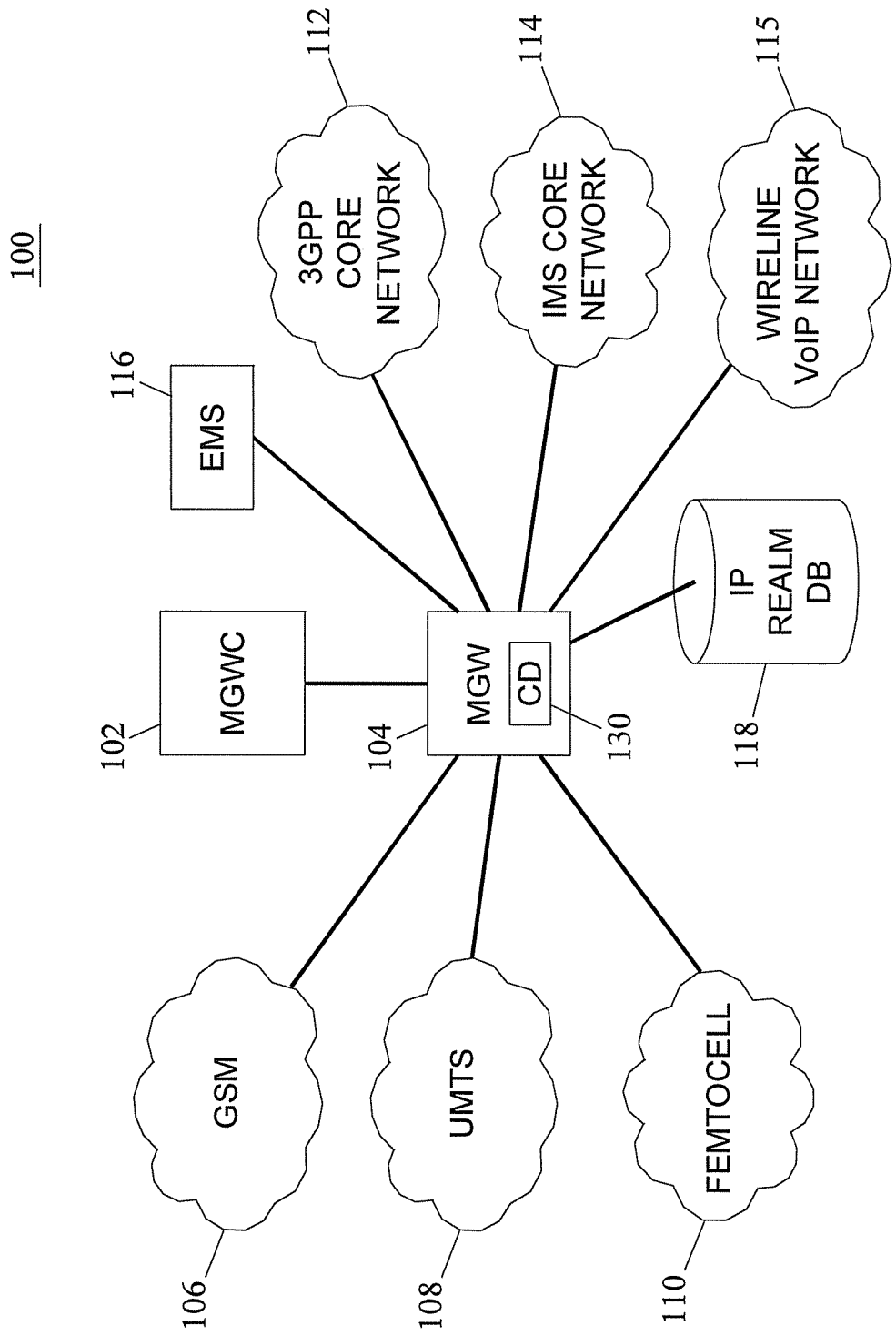
FIG. 1 is block diagram illustrating an exemplary system for supporting a plurality of RTP multiplexing enablement methods in a media gateway according to an embodiment of the subject matter described herein.

The present subject matter introduces a media gateway that provides a plurality of real-time transport protocol (RTP) multiplexing enablement methods in order to support multiple network and interface types. FIG. 1 depicts an exemplary system 100 that includes a media gateway 104 which may be configured to simultaneously support packet based communication between wireless access technologies, wireless core networks, and wireline voice over Internet protocol (VoIP) networks. As shown in FIG. 1, media gateway 104 may be connected to wireless access networks and technologies such as, but not limited to, a Global System for Mobile Communications (GSM) access network 106 (e.g., via an AoIP interface), a Universal Mobile Telecommunications System (UMTS) access network 108 (e.g., via an IuCS Over IP interface), and a femtocell access network 110 (e.g., via an Iuh interface). Similarly, media gateway 104 may communicate with core networks such as, but not limited to, a 3rd Generation Partnership Project (3GPP) wireless core network 112 (e.g., via an Nb interface), an IP Multimedia Subsystem (IMS) core network 114 (e.g., via an Mb interface), and a wireline VoIP network 115. Media gateway 104 may also be connected to and receive instructions/commands from at least one media gateway controller 102 in system 100.

In one embodiment, media gateway 104 may be configured to enable and simultaneously support a plurality of RTP multiplexing enablement methods, any one of which can be used to facilitate the multiplexed packet communication between two or more of the networks shown in FIG. 1. For example, media gateway 104 may receive, over a first communications link, packet data from a peer node (e.g., a network media gateway, an IP-based GSM Base Station Controller, or a femtocell). The packet data may include media data associated with a call originating from an endpoint (e.g., a mobile device) in GSM network 106. Similarly, media gateway 104 may negotiate packet communications to a second peer node in a second network over a second link interface. Media gateway 104 may also perform RTP multiplexing on outgoing packets (e.g., facilitate a negotiation process and multiplex the received packets) and forward the multiplexed packets to an appropriate peer node. As will be discussed below, the manner in which the RTP multiplexing is negotiated or enabled depends on several factors, including the interface type used by the peer node to communicate packet data and the configuration of media gateway 104.

The link interface that exists between media gateway 104 and a peer node may be broadly classified as either an Iuh interface or a non-Iuh interface. An Iuh interface is one that exists between a media gateway and a femtocell unit or network. In contrast, a non-Iuh interface is a link interface existing between a media gateway and any other network type. Upon detecting a non-Iuh interface type, media gateway 104 may attempt to enable bi-directional multiplexing by initiating an RTP multiplexing negotiation procedure via the exchange of RTCP Application defined packets (i.e., "RTCP App packets"). Notably, the negotiation procedure may entail media gateway 104 and a peer node exchanging port address data that indicates the respective local multiplexing ports (e.g., the designated port in which a given media gateway or peer node is to receive multiplexed IP packets) over a non-Iuh interface.

Alternatively, some RTP multiplexing processes may be triggered upon detecting an Iuh interface without performing the negotiation procedure. For example, media gateway 104 may receive packet data over a link from femtocell 110. Media gateway 104 may learn that an Iuh interface is being used by the communicating femtocell. For example, media gateway 104 may be informed that the femtocell is employing an Iuh interface via the H.248 signaling from media gateway controller 102 (e.g., via the 3GPP user plane package, or 3GUP package). In such a case, a media gateway controller 102 associated with media gateway 104 may utilize an out-of-band signaling message to enable uplink-only multiplexing. For example, media gateway controller 102 may send, to femtocell 110, out-of-band OA&M signaling messages (e.g., HNBAP protocol messages) that indicate the designated port of media gateway 104 for receiving multiplexed packets.

In one embodiment, media gateway 104 of the present subject matter is configured to enable and negotiate RTP multiplexing across different interface types. In contrast, traditional media gateways are typically configured to only support either Iuh or non-Iuh interfaces. In one embodiment, a peer node (e.g., a media gateway, an IP-based GSM base station controller, a media resource function processor (MRFP), border gateway function (BGF), etc.) in GSM network 106 receives a message from an endpoint requesting a call session with a second endpoint in a second network. The peer node in GSM network 106 then directs a call signaling message requesting a call session with the second endpoint to media gateway controller 102. In response, media gateway controller 102 sends an H.248 Add command to media gateway 104 to establish a new termination for one section of the media portion of the call. Upon receiving the H.248 Add command message, media gateway 104 attempts to determine if RTP multiplexing should be enabled for the call session. In short, media gateway 104 supports a plurality of RTP multiplexing enablement methods, such as a per IP interface type method, a global RTCP negotiation method, and a per IP realm method. The RTP multiplexing enablement method employed by media gateway 104 may be indicated by parameters designated in configuration data 130. In one embodiment, configuration data 130 is stored locally on media gateway 104 and may be modified by a user and provisioned to media gateway 104 via an element management system (EMS) 116. Configuration data 130 includes information specific to media gateway 130 such as, for example, whether RTP multiplexing negotiation is enabled for media gateway 104 and which negotiation method is used. Specifically, an RTP multiplexing indicator in the configuration data 130 dictates whether the media gateway 104 is presently set to perform RTP multiplexing in accordance with at least one of: 1) the per-IP interface type method, 2) the global RTCP negotiation method, and 3) the per IP realm method. Similarly, configuration data 130 may also indicate that RTP multiplexing is currently disabled on media gateway 104. In one embodiment, media gateway 104 may be configured to function as a plurality of virtual media gateways, each of which is set with a different RTP multiplexing indicator. That is, a physical media gateway may be divided into multiple virtual media gateways, each of which is controlled by a different media gateway controller. As indicated above, configuration data 130 may include an RTP multiplexing indicator that specifies that media gateway 104 is configured to conduct per-IP interface type RTP multiplexing. In this scenario, media gateway 104 first identifies the interface used to communicate packets between the peer node and media gateway 104. Media gateway 104 may determine the type of interface in any number of ways. For example, media gateway controller 102 may determine that an Iu or Nb interface is being used from the initial call signaling messages received from the peer node and may subsequently provide the interface type information to media gateway 104 using call control signaling. It is understood that a media gateway controller recognizes the types of networks (e.g., access vs. core networks) it communicates with, and thus recognizes the difference between signaling from an access network (Iu) as compared to a core network (Nb). Notably, the protocols used by the access and core networks are completely different. In an alternate embodiment, media gateway 104 may determine the interface type from the VoIP voice trunk group that has been designated to process the call session by media gateway controller 102 (i.e., certain voice trunk groups in media gateway 104 are associated with specific interface types). For example, the media gateway controller 104 may be configured to both select a trunk group to be utilized for a given session and subsequently inform media gateway 104 of the trunk group selection via signaling.

After determining the interface type, media gateway 104 may then initiate a negotiation procedure if media gateway 104 detects that an Nb or AoIP interface is being utilized by the peer node to communicate packets. In one embodiment, the negotiation procedure includes the peer node and media gateway 104, which are communicatively connected via the Nb or AoIP interface, exchanging RTCP App packets. RTCP App messages are signaling messages that indicate that the sending node is able to conduct RTP multiplexing. RTCP App packets also indicate the sending node's designated port for receiving RTP multiplexed packets (e.g., UDP local mux port). For example, media gateway 104 sends an RTP App packet at session setup to the peer node to indicate the media gateway's ability to receive multiplexed packets and whether or not media gateway 104 wishes to send multiplexed packets. Media gateway 104 does not employ RTP multiplexing for the call session until the peer node sends its own RTCP App packet indicating its ability to support RTP multiplexing and the UDP port to which the multiplexed packets should be sent.

Once the negotiation process is completed, media gateway 104 beings sending RTP multiplexed packets over the link to the peer node. Likewise, a similar negotiation process may be conducted between media gateway 104 and a downstream destination peer node (e.g., a peer node in the network servicing the intended called party) that is participating in the call session.

As mentioned above, configuration data 130 of media gateway 104 may be set to conduct a global RTCP negotiation method regardless of the interface between media gateway 104 and the peer node (e.g., in instances where determining the interface type is not possible or desired). Global RTCP negotiation relies on the fact that peer nodes communicating with media gateway 104 are expected to ignore any unknown RTCP App packet that is received (as per IETF RFC 3550). In one embodiment, media gateway 104 is adapted to initiate RTP multiplexing negotiation with a peer node by sending RTCP App packets regardless of the link interface type existing between the two peer nodes. If the receiving peer node is 3GPP 29.414 compliant, the peer node will complete the negotiation process by responding to the RTCP App packet from media gateway 104 with a RTCP App response packet. Afterwards, the two peer nodes are able to communicate RTP multiplexed packets with each other. Conversely, if the peer node is 3GPP 25.444 compliant (i.e., a femtocell) or simply does not support RTP multiplexing, the peer node will ignore and discard the RTCP App packet sent by media gateway 104. In this particular scenario, media gateway 104 does not enable RTP multiplexing of packets towards the 3GPP 25.444 compliant peer node since the negotiation process is never completed (i.e., since an RTCP App response is not received by media gateway 104). However, media gateway 104 is still capable of receiving multiplexed packets from these types of peer nodes, thereby fulfilling 3GPP 25.444 requirements.

Media gateway 104 may also be configured to perform a "Per IP realm" RTP multiplexing enablement method. In one embodiment, this method ties an RTP multiplexing enablement scheme to each IP realm (e.g., an IP address space or network) configured on media gateway 104. Each IP realm may be configured with an RTP multiplexing indicator/attribute that specifies whether 1) negotiated RTP multiplexing (e.g., 29.414 method), 2) non-negotiated RTP multiplexing (e.g., 25.444 method), or 3) no RTP multiplexing (i.e., disabled) is supported for the associated IP realm. In one embodiment, a database 118 associated with media gateway 104 stores a plurality of IP realm identifiers and/or IP domain addresses that are mapped to a respective plurality of RTP multiplexing indicators. For example, database 118 may be communicatively connected to media gateway 104 (as shown in FIG. 1) or may be locally contained within media gateway 104. Table 1 depicts an exemplary database for storing IP realm identifiers, IP domain addresses, and RTP multiplexing indicators.

TABLE 1

| IP Realm Identifier | IP Domain Address | RTP Multiplexing Type |
|---|---|---|
| Femtocell | 192.20.xx.xx | Non-negotiated |
| AoIP | 192.30.xx.xx | Negotiated |
| 3GGP Iu | 192.40.xx.xx | Disabled |
| 3GPP Core | 192.50.xx.xx | Negotiated |
| IMS | 192.60.xx.xx | Negotiated |

In order to conduct the IP realm multiplexing method, media gateway 104 requires an IP realm identifier, IP domain address, or the like to query the IP realm database 118. In one embodiment, media gateway controller 102 is H.248.41 compliant and obtains an IP realm identifier or IP domain address that is associated with the network in which the sending peer node resides. In one embodiment, media gateway controller 102 is provisioned with an IP realm database (local or external to media gateway controller 102) that maps IP realm identifiers with other data, such as origination IP addresses, Gigabit Ethernet (GigE) ports, or ingress virtual local area networks (VLANs). For example, media gateway controller 102 may, upon receiving a signaling message from a sending media gateway controller, query its own local IP realm database (or an external database associated with media gateway controller 102) to look up the IP realm indicator of the sending node using data obtained or associated with the received signaling message. For example, media gateway controller 102 may inspect and utilize the origination IP address (e.g., the network portion of the IP address) of the received signaling message and use the address to query its local IP realm database to determine the IP realm type/indicator of the network associated with the sending peer node (and sending media gateway controller). In an alternate embodiment, media gateway controller 102 may be configured to receive signaling messages from a given IP Realm (i.e., a group of peers) over a specific ingress Gigabit or Fast Ethernet port. Thus, media gateway controller 102 may use the specific GigE port the signaling message was received on in order to query the local IP realm database to determine the IP realm. In a similar embodiment, media gateway controller 102 may be configured to utilize multiple ingress VLANs to receive signaling messages. Media gateway controller 102 may utilize the specific VLAN used to receive the signaling message to query the local database in order to detect the realm type. Regardless of the type of mapping used by its local IP realm database (e.g., Origination IP address-IP Realm mapping, ingress GigE port-IP realm mapping, ingress VLAN-IP Realm mapping), media gateway controller 102 may then obtain and subsequently provide an indicator of the IP realm to media gateway 104 in an H.248 Add command using an IP realm identifier property of the H.248.41 "IP Domain Connection Package."

In another embodiment, media gateway 104 may use a default IP realm identifier if no other IP realm identifier can be obtained. In one embodiment, the default IP realm identifier is read from IP realm database 118 in media gateway 102. For example, Table 1 above may be provisioned with another column that includes a heading/legend of "Default IP realm". This column would include an indicator (e.g., an "X" or "YES") in only one of the rows in Table 1. In the event media gateway 104 receives an ADD command without an IP realm identifier from media gateway controller 102, media gateway 102 queries database 118 (e.g., Table 1) for the one entry designated as the default. Media gateway 104 may then use that entry's realm information (e.g., RTP Multiplexing type) to process the call session.

After the IP realm identifier is obtained, media gateway 104 uses the IP realm identifier to query database 118 and determines how RTP multiplexing is to be conducted, if at all. Namely, media gateway 104 reads the associated RTP multiplexing enablement type (i.e., negotiated, non-negotiated, disabled) for the specified realm from its configuration data 130 or database 118 and follows the appropriate behavior (e.g., sending an RTCP App packet to the peer node or not). For example, if the query determines that the IP realm identifier indicates a "negotiated" enablement type for a particular IP realm, then media gateway 104 sends an RTCP App packet to the peer node to initiate the negotiation process. Otherwise, media gateway 104 processes the call normally without RTP multiplexing negotiation.

Figure 2:
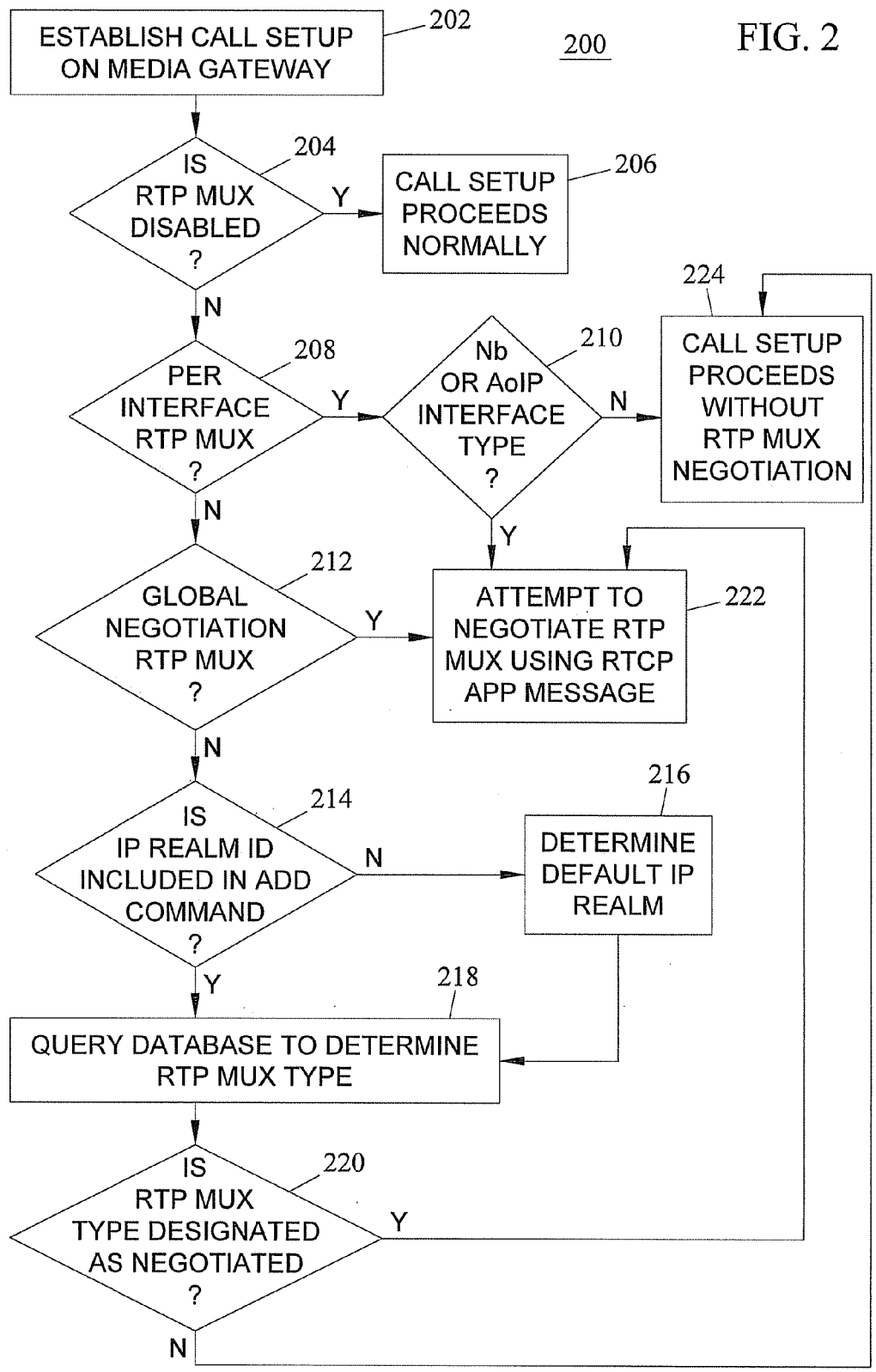
FIG. 2 is a flow chart illustrating an exemplary process for supporting a plurality of RTP multiplexing enablement methods in a media gateway according to an embodiment of the subject matter described herein.

FIG. 2 is a flow chart illustrating an exemplary method 200 for enabling RTP multiplexing in a media gateway according to an embodiment of the subject matter described herein. At block 202, a new call termination is established on a media gateway. In one embodiment, media gateway controller 102 first receives a call session setup message from a peer node requesting to establish a communications session (e.g., a VoIP call session) directed to a destination endpoint. Media gateway controller 102 then sends a command message (e.g., an H.248 Add command message) that instructs media gateway 104 to establish a media path with the peer node.

At block 204, a determination is made as to whether RTP multiplexing is disabled on the media gateway. In one embodiment, media gateway 104 determines whether RTP multiplexing capabilities are enabled or disabled. For example, configuration data 130 may include an indicator that indicates whether RTP multiplexing is disabled on media gateway 104. If the RTP multiplexing capabilities are disabled on media gateway 104, then method 200 continues to block 206 where the call setup process proceeds as normal. If RTP multiplexing is not disabled on media gateway 104, then method 200 continues to block 208.

At block 208, a determination is made as to whether the media gateway is utilizing per-interface RTP multiplexing. In one embodiment, configuration data 130 may include an indicator that indicates that media gateway 104 is set to conduct per-interface RTP multiplexing. If media gateway 104 is designated to conduct per-interface RTP multiplexing, then method 200 continues to block 210. If it is determined that media gateway 104 is not set to conduct per-interface RTP multiplexing, then method 200 proceeds to block 212.

At block 210, a determination is made as to whether the peer node is communicating packets to the media gateway via an Nb or AoIP interface. In one embodiment, media gateway 104 receives a message indicating that the link interface used by the peer node to communicate packets to media gateway 104 is an Nb interface type or an AoIP interface type. For example, media gateway controller 102 may determine the interface type from signaling messages received from the peer node and provide the interface type information to media gateway 104 via a control message. If the link interface is an Nb or AoIP interface type, then method 200 continues to block 222 where media gateway 104 attempts to negotiate RTP multiplexing with the sending peer node using an RTCP App message. In contrast, if an Nb or AoIP interface type is not being used between the peer node and media gateway 104, then method 200 continues to block 224 where media gateway 104 proceeds to conduct a call setup procedure without RTP multiplexing negotiation (e.g., media gateway 104 does not sent an RTCP App message).

Returning to block 212, a determination is made as to whether global negotiation RTP multiplexing is being employed by the media gateway. If media gateway 104 is set (e.g., according to an indicator in configuration data 130) to utilize global RTP multiplexing, then method 200 continues to block 222 where media gateway 104 attempts to negotiate RTP multiplexing with the peer node by sending the peer node an RTCP App message. Notably, the RTCP App message is sent regardless of the type of link interface that exists between the peer node and media gateway 104. If it is determined that media gateway 104 is not set to use global negotiation RTP multiplexing, then method 200 proceeds to block 214.

In block 214, a determination is made as to whether an IP realm identifier is included in the ADD command from the media gateway controller. In one embodiment, media gateway 104 determines whether an H.248 ADD command message sent from media gateway controller 102 includes an IP realm identifier. If an IP realm identifier is included in the H.248 ADD command, method 200 continues to block 218. Otherwise, method 200 proceeds to block 216 where media gateway 104 determines the identifier of an IP realm associated with the media gateway 104 that has been designated as the default IP realm. Method 200 then continues to block 218.

In block 218, a database is queried to determine the RTP multiplexing type associated with the IP realm. In one embodiment, media gateway 104 determines the multiplexing type for a particular realm by accessing its IP realm configuration data or from the H.248 ADD command from media gateway controller 102 (as indicated in block 214). For example, media gateway 104 is able to query an IP realm database 118 which contains IP realm configuration data that indicates whether the RTP multiplexing enablement type associated with a particular IP realm is disabled, non-negotiated, or negotiated.

In block 220, a determination is made as to whether the RTP multiplexing negotiation/enablement method utilized by the IP realm is designated as "negotiated." In one embodiment, media gateway 104 determines if the IP realm hosting the peer node accommodates a "negotiated" RTP multiplexing negotiation method (as indicated in the database). If RTP multiplexing negotiation is employed, then method 200 continues to block 222 where media gateway 104 attempts to negotiate RTP multiplexing with the peer node using an RTCP App message. If it is determined that RTP multiplexing negotiation is not being used (i.e., disabled or non-negotiated status), then method 200 proceeds to block 224 where media gateway 104 proceeds to conduct a call setup procedure without RTP multiplexing negotiation. In such a case, media gateway 104 may still receive RTP multiplexed packets from the peer, but will forego any negotiation procedure and will not transmit RTP multiplexed packets.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for enabling real-time transport protocol (RTP) multiplexing in a media gateway, the system comprising:
a media gateway controller configured to receive a signaling message to establish a call from a peer node in a first network and to determine, if possible, an interface type used by the peer node to communicate a media portion of the call and to transmit a call control message that includes the interface type to a media gateway; and the media gateway comprising an Internet protocol (IP) realm database and configured to perform a first and second RTP multiplexing enablement process on the media portion of the call where determining the interface type is not possible;

wherein the first RTP multiplexing enablement process includes sending a real-time transport control protocol (RTCP) Application packet to the peer node, refraining from performing RTP multiplexing on packets sent to the peer node until a reply RTCP Application packet is received from the peer node, and receiving RTP multiplexed packets from the peer node; and wherein the second RTP multiplexing enablement process includes obtaining an IP realm identifier that identifies the first network, accessing the IP realm database using the IP realm identifier to determine a predefined multiplexing enablement action for packets destined for the first network, and executing the determined predefined multiplexing enablement action on packets sent to the peer node in the first network.

2. The system of claim 1 wherein the media gateway is further configured to receive the call control message from the media gateway controller and to perform a third RTP multiplexing enablement process that includes performing a negotiation procedure if the interface type is either an Nb interface or an AoIP interface.

3. The system of claim 1 wherein determining the IP realm identifier includes at least one of receiving the IP realm identifier from the media gateway controller in an H.248 ADD command message or using a default IP realm identifier stored in media gateway configuration data.

4. The system of claim 3 wherein the configuration data is either stored locally within the media gateway or in a network node communicatively connected to the media gateway.

5. The system of claim 1 wherein the media gateway controller is configured to send via out-of-band signaling, to the peer node, UDP multiplexing port information associated with the media gateway after determining that the interface type is an Iuh interface type.

6. The system of claim 1 wherein the predefined multiplexing enablement action is negotiated, non-negotiated, or disabled.

7. The system of claim 1 wherein the first RTP multiplexing process includes receiving the reply RTCP Application packet from the peer node, wherein the peer node is 3GPP 29.414 compliant.

8. The system of claim 1 wherein the first RTP multiplexing process includes receiving RTP multiplexed packets from the peer node that ignores the RTCP Application packet sent from the media gateway, wherein the peer node is 3GPP 25.444 compliant and receives UDP multiplexing port information associated with the media gateway from a signaling message from the media gateway.

9. The system of claim 1 wherein the peer node includes at least one of a media gateway, an IP-based GSM base station controller, a media resource function processor (MRFP), border gateway function (BGF), or a femtocell.

10. The system of claim 2 wherein the interface type includes an AoIP interface, an IuCS Over IP interface, an Iuh interface, an Nb interface, and an Mb interface.

11. A method for enabling real-time transport protocol (RTP) multiplexing in a media gateway, the method comprising:

receiving, at a media gateway controller, a signaling message to establish a call from a peer node in a first network;

determining, at the media gateway controller, if possible, an interface type used by the peer node to communicate a media portion of the call;

transmitting, by the media gateway controller to a media gateway comprising an Internet protocol (IP) realm database, a call control message that includes the interface type;

performing, at the media gateway, at least one of a first and second RTP multiplexing enablement process on a media portion of the call where determining the interface type is not possible;

wherein the first RTP multiplexing enablement process includes sending an real-time transport control protocol (RTCP) Application packet to the peer node, refraining from performing RTP multiplexing on packets sent to the peer node until a reply RTCP Application packet is received from the peer node, and receiving RTP multiplexed packets from the peer node; and wherein the second RTP multiplexing enablement process includes obtaining an IP realm identifier that identifies the first network, accessing the IP realm database using the IP realm identifier to determine a predefined multiplexing enablement action for packets destined for the first network, and executing the determined predefined multiplexing enablement action on packets sent to the peer node in the first network.

12. The method of claim 11 wherein the media gateway is further configured to to receive the call control message from the media gateway controller and to perform a third RTP multiplexing enablement process that includes performing a negotiation procedure if the interface type is either an Nb interface or an AoIP interface.

13. The method of claim 11 wherein determining the IP realm identifier includes at least one of receiving the IP realm identifier from the media gateway controller in an H.248 ADD command message or using a default IP realm identifier stored in media gateway configuration data.

14. The method of claim 13 wherein the configuration data is either stored locally within the media gateway or in a network node communicatively connected to the media gateway.

15. The method of claim 11 wherein the media gateway controller is configured to send via out-of-band signaling, to the peer node, UDP multiplexing port information associated with the media gateway after determining that the interface type is an Iuh interface type.

16. The method of claim 11 wherein the predefined multiplexing enablement action is negotiated, non-negotiated, or disabled.

17. The method of claim 11 wherein the first RTP multiplexing process includes receiving the reply RTCP Application packet from the peer node, wherein the peer node is 3GPP 29.414 compliant.

18. The method of claim 11 wherein the first RTP multiplexing process includes receiving RTP multiplexed packets from the peer node that ignores the RTCP Application packet sent from the media gateway, wherein the peer node is 3GPP 25.444 compliant and receives UDP multiplexing port information associated with the media gateway from a signaling message from the media gateway.

19. The method of claim 11 wherein the peer node includes at least one of a media gateway, an IP-based GSM base station controller, a media resource function processor (MRFP), border gateway function (BGF), or a femtocell.

20. The method of claim 11 wherein the interface type includes an AoIP interface, an IuCS Over IP interface, an Iuh interface, an Nb interface, and an Mb interface.

21. A non-transitory computer readable medium having stored thereon executable instructions that when executed by the processor of a computer control the computer to perform steps comprising:

receiving, at a media gateway controller, a signaling message to establish a call from a peer node in a first network;

determining, at the media gateway controller, if possible, an interface type used by the peer node to communicate a media portion of the call;

transmitting, by the media gateway controller to a media gateway comprising an Internet protocol (IP) realm database, a call control message that includes the interface type;

performing, at the media gateway, at least one of a first and second RTP multiplexing enablement process on a media portion of the call where determining the interface type is not possible;

wherein the first RTP multiplexing enablement process includes sending an real-time transport control protocol (RTCP) Application packet to the peer node, refraining from performing RTP multiplexing on packets sent to the peer node until a reply RTCP Application packet is received from the peer node, and receiving RTP multiplexed packets from the peer node; and wherein the second RTP multiplexing enablement process includes obtaining an IP realm identifier that identifies the first network, accessing the IP realm database using the IP realm identifier to determine a predefined multiplexing enablement action for packets destined for the first network, and executing the determined predefined multiplexing enablement action on packets sent to the peer node in the first network.

22. The computer readable medium of claim 21 wherein the media gateway is further configured to receive the call control message from the media gateway controller and to perform a third RTP multiplexing enablement process that includes performing a negotiation procedure if the interface type is either an Nb interface or an AoIP interface.

* * * * *